July 23, 1963 H. LAUDON 3,098,932
INFRA-RED GAS DETECTION SYSTEM
Filed Nov. 19, 1959 2 Sheets-Sheet 2

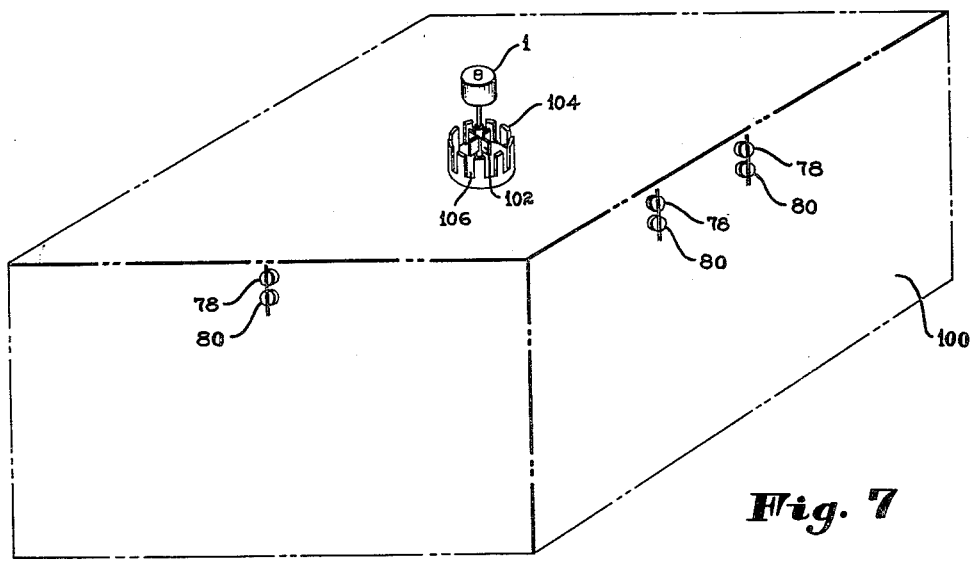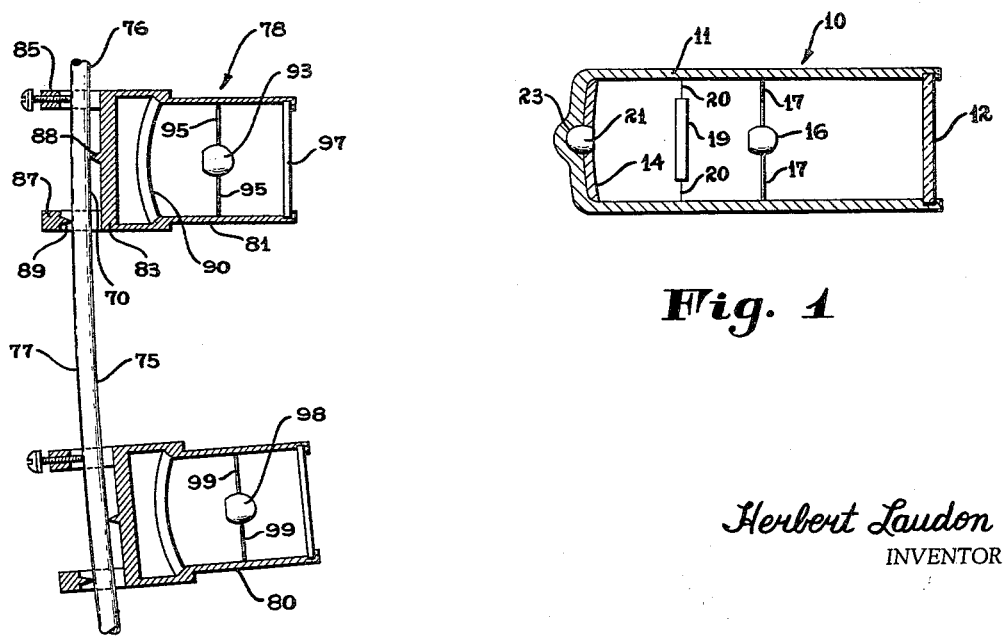

Herbert Laudon
INVENTOR

BY Watson, Cole, Grindle & Watson
ATTORNEYS

United States Patent Office 3,098,932
Patented July 23, 1963

---

3,098,932
INFRA-RED GAS DETECTION SYSTEM
Herbert Laudon, Forest Hills, N.Y., assignor to Leesona Corporation, Providence, R.I., a corporation of Massachusetts
Filed Nov. 19, 1959, Ser. No. 854,171
8 Claims. (Cl. 250—83.3)

This invention relates to a gas detection system and more particularly to an area monitoring gas detection system employing infra-red radiation.

Many types of gas detection apparatus are employed to monitor an area and actuate alarms and extinguisher systems. For example, a warehouse may be provided with a sprinkler system employing an elaborate device responsive to the infra-red radiation of the flame itself. The sensitivity of these types of apparatus is one of the principal features in determining their effectiveness in preventing damage. However, in addition to being elaborate and cumbersome, the apparatus presently in use are relatively insensitive.

Accordingly, it is an object of this invention to provide an improved infra-red gas detection system.

It is another object of this invention to provide an infra-red area monitoring system which is highly sensitive.

It is still another object of this invention to provide an infra-red gas detection system which is economical to fabricate, simple to operate and has a relatively simple optical system.

It is another object of this invention to provide a unitary gas detection system capable of transmitting and receiving infra-red radiation.

It is another object of this invention to provide a highly sensitive gas detection system for continuously monitoring a predetermined area.

Briefly, in accordance with aspects of a first illustrative embodiment of this invention, an infra-red transmitter and receiver are assembled as a unit and cooperate with a folded optical system to monitor the area for the presence of gas. This transmitter-receiver, which may be termed a transceiver, employs an infra-red source, a modulator reflector positioned to modulate the rays emitted from said source and an optical system including the reflector and an infra-red responsive cell positioned to receive infra-red rays from the reflector. The infra-red rays travel substantially the same path twice because of the novel "folded" optical system. Any predetermined gas, such as carbon dioxide or smoke, will cause a decrease in the rays transmitted. The detector senses this decrease and actuates an alarm.

In accordance with other aspects of the first embodiment of this invention, an infra-red emitter and an infra-red detector element are aligned with the axis of and enclosed by a container to define a transceiver. The front end of the container is formed by a window while the rear is formed by a parabolic reflector. Advantageously, the emitter is positioned at the focal point of the parabolic reflector and the detector element is mounted on the parabolic reflector at the point of the reflector axis. Also, advantageously, a second mirror is positioned between the emitter and detector elements to screen the detector element from the direct rays from the emitter. This second mirror also acts as a reflector which cooperates with the parabolic reflector to direct the received rays onto the detector element. The modulator unit employed with the transceiver is a crossed mirror arrangement which is rotated about an axis which is perpendicular to the axis of the parabolic reflector of the transceiver.

In accordance with a second illustrative embodiment of this invention, a synchronizing signal is obtained from a modulated infra-red radiating source and transmitted to the circuit containing the infra-red detector to increase the sensitivity of the detector in synchronism with the transmission of the modulated infra-red rays. The signal thus obtained from the infra-red detector circuit is transmitted to an indicator or to an alarm device.

In accordance with other aspects of the second illustrative embodiment of this invention, an area monitoring infra-red detection system includes infra-red transceivers mounted peripherally of the area to be monitored and a fixed reflector positioned centrally of the area, the reflector including a pair of angularly positioned mirrors. The rays transmitted from the transceivers are modulated by means of a slotted cylindrical member positioned concentrically of the infra-red source of the transceiver and encasing the source. This cylindrical member has longitudinal apertures spaced equidistant about its periphery. This cylindrical member may be driven by any convenient mechanism, such as a synchronous motor. A first infra-red detector is positioned adjacent the cylindrical member and delivers synchronizing signals to its associated amplifier indicative of the phase of modulation of the infra-red source. These synchronizing signals are fed to a phase sensitive rectifier, which rectifier also receives signals from the infra-red detector associated with the reflector system. The synchronizing signals increase the sensitivity of the phase sensitive rectifier at predetermined times and decrease the sensitivity at other predetermined times. Accordingly, the rectifier will be more sensitive at the time a modulated infra-red signal is transmitted to the reflector system, thereby greatly improving the sensitivity of the area monitoring device.

In a third and preferred illustrative embodiment of this invention, a plurality of infra-red transceivers are mounted around the periphery of the region to be monitored. The infra-red sources are not modulated but a single crossed mirror modulator is rotatably mounted in the center of the region. Each of the transceivers are directed toward the mirror modulator. Advantageously, a slotted cylindical infra-red shield encircles the rotating modulator to prevent the radiations from one transceiver from reaching other transceivers. This embodiment is preferred from the economic standpoint since the individual infra-red sources are not modulated and the transceiver units are cheaper than separate transmitters and receivers.

In accordance with a fourth illustrative embodiment of this invention, a plurality of separate infra-red transmitters and receivers are mounted around the periphery of the region to be monitored and each directed toward a rotating modulating reflector. Advantageously, the reflector is polygonal such that each transmitter transmits rays which are reflected to more than one receiver. In one illustrative embodiment, the reflector is octagonal and four transmitters are radially positioned 90 degrees apart about the reflector with receivers radially located 30 degrees on each side of the transmitter.

In accordance with a fifth illustrative embodiment of this invention, a plurality of pairs of separate infra-red transmitters and receivers are positioned around the periphery of the area to be monitored. A rotating angular mirror is positioned centrally of the area to be monitored. The pairs of separate transmitters and receivers are vertically aligned and each transmitter and receiver has its axis directed toward the rotating reflector. Advantageously, the separate transmitters and receivers may be assembled on a single member, such as a rod, to facilitate installation and alignment. Further, the rod may have a curvature sufficient to direct the axes of the associated transmitter and receiver toward the rotating reflector. Also, advantageously, the single rotating reflector acts as a modulator for each of the infra-red transmitters.

In accordance with other aspects of this invention, a portion of the detector system is located remote from the infra-red source and includes a novel crossed mirror system which may be rotatably mounted. Advantageously, this crossed mirror system produces a reflected signal of greatly increased power as compared to that of a single flat mirror.

It is a feature of the first illustrative embodiment of this invention to employ in an infra-red area monitoring system a transceiver unit having axially aligned transmitter and receiver elements, the transmitter element being located in a forward section and isolated from the receiver in the rearward section by means of a second mirror.

It is another feature of the first illustrative embodiment of this invention to employ in an infra-red transceiver a curved mirror in the rearward portion of the unit, an infra-red detector unit mounted in the mirror and a second mirror mounted intermediate the transmitter element and the detector element and positioned to prevent the direct passage of infra-red rays from the transmitter element to the receiver element while permitting infra-red rays to pass around the second mirror to reflect on the curved mirror toward the second mirror and from the second mirror onto the detector element.

It is another feature of the first illustrative embodiment of this invention to employ a transceiver unit with a rotating crossed mirror modulator, which modulator reflects a high-powered signal to the transceiver.

It is a feature of the second illustrative embodiment of this invention to employ in an area monitoring gas detection system a modulated infra-red source, a folded optical system including a reflector system positioned to receive rays from the source and a transceiver including a first infra-red detector positioned to receive rays from the reflector system, a second infra-red detector positioned to receive infra-red rays directly from the infra-red source, which second infra-red responsive device is connected to a synchronous signal amplifier to deliver a sensitizing signal to the circuit container the first infra-red cell to thereby increase the sensitivity of the area monitoring system.

It is a feature of the second embodiment of this invention to employ in an area monitoring infra-red system a pair of reflectors positioned to reflect infra-red rays toward each other to define a folded optical system, to position an infra-red source beyond the focal point of the parabolic first reflector, and to direct modulated infra-red rays onto the parabolic first reflector to thereby cause the reflector to transmit a slightly converging beam toward the second reflector, to employ a crossed or perpendicular pair of reflecting surfaces as a second reflector to reflect a converging beam toward the infra-red source, and to place an infra-red detector beyond the reflecting system in alignment with the two reflectors.

It is another feature of the second embodiment of this invention to employ a second infra-red detector positioned between the source of modulated infra-red rays and the first infra-red detector, which second detector also acts as a screen to prevent the direct transmission of infra-red rays from the source to the first infra-red detector.

It is another feature of the second embodiment of this invention to provide a unitary area monitoring gas detection system including a source of modulated infra-red rays, a first reflector positioned in the path of the rays, a second reflector aligned with the first reflector and redirecting a converging beam toward the first reflector, and an infra-red detector positioned axially of the first reflector to receive the rays from the second reflector. The reflecting system acts as a folded optical system to minimize the space required for the optical systems, provision being made for passing gas between the reflectors.

It is still a further feature of the second embodiment of this invention to employ a detector with the second infra-red responsive device to deliver a synchronizing signal to the infra-red receiving system which includes the first infra-red responsive device, which signal periodically increases the sensitivity of the receiving system.

It is a feature of the third and fourth embodiments of this invention to employ a single rotating modulating reflector in combination with a number of transceivers in the third embodiment and transmitters and receivers in the fourth embodiment. The modulating reflector may be of the crossed reflector type which directs a focused beam from one transmitter to only one receiver or it may be of the polygonal type which directs the rays from one transmitter to several receivers.

It is a feature of the third embodiment of this invention to provide an infra-red gas detection system with a transceiver having an emitter and a detector mounted on the axis of a parabolic reflector, the emitter mounted at the focal point and the detector mounted on the reflector with a second mirror between the emitter and reflector. This second mirror acts as a screen between the emitter and detector to direct rays from reaching the detector. The second mirror also cooperates with the parabolic reflector to reflect the rays received from the modulator to the detector element.

It is a feature of the fourth illustrative embodiment of this invention to employ in an area gas detection system a plurality of separate transmitters radially spaced with respect to the center of the area to be monitored, a plurality of receivers interspersed between the transmitters and in the same plane of the transmitters and a polygonal reflector mounted in the center of the area to be monitored with the reflector rotatably mounted to effectively modulate the infra-red beams from the transmitters and reflect these beams to one of the receivers.

It is a feature of the fifth illustrative embodiment of this invention to employ a plurality of pairs of separate transmitters and receivers positioned about the periphery of the area to be monitored by an infra-red gas detection system, which pairs of transmitters and receivers are vertically aligned, each of the transmitters and receivers being directed toward a mirror such that the mirror acts to modulate the beams and direct them toward the receivers, each receiver and transmitter having its axis directed toward the mirror.

It is another feature of this invention to employ a crossed mirror reflector with a means for rotating the mirror to reflect a high energy signal from an infra-red transmitter to an infra-red detector in a gas area monitoring system, thereby to improve the sensitivity of the system and to eliminate the susceptibility of the system to random noise.

These and various other objects and features of this invention will be more clearly understood from a reading of a detailed description of this invention with reference to the drawings, in which:

FIGURE 1 is a view in elevation, partly in section, of a transceiver which may be employed in the first and third illustrative embodiments of this invention;

FIGURE 6 is a view in elevation, partly in section, of the transmitter and receiver of the fifth illustrative embodiment of this invention; and FIGURE 7 is a perspective view of the fifth illustrative embodiment of this invention.

Figure 4:
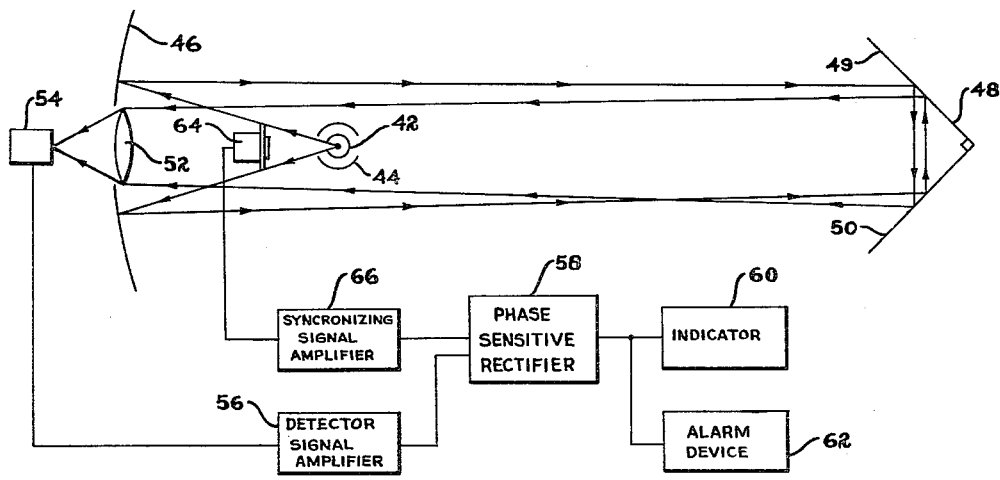
FIGURE 4 is a combined schematic and block diagram of the second illustrative embodiment of this invention.

Referring now to FIGURE 1, there is depicted a transceiver 10 such as may be employed in certain embodiments of this gas detection system. The transceiver 10 comprises a hollow tube-like body 11 having a window 12 at its front end and a reflector 14 at its rearward end. An infra-red emitter 16 is mounted in the forward end in the region of the focal point of reflector 14 by means of suitable wires 17, which wires may be employed to energize the emitter. A second mirror 19 is suspended in the tubular body 11 by means of wires 20. An infra-red sensitive element 21 is positioned in a recess 23 on the reflector 14 in the region of the axis thereof. The reflector 19 acts as a shield to prevent direct radiation from emitter 16 reaching the infra-red sensitive element 21. The radiated rays which pass around reflector 19 will be reflected by reflector 14 and radiated in a substantially parallel beam through window 12. These rays will be incident upon the mirror modulator which will be subsequently described.

Figure 2:
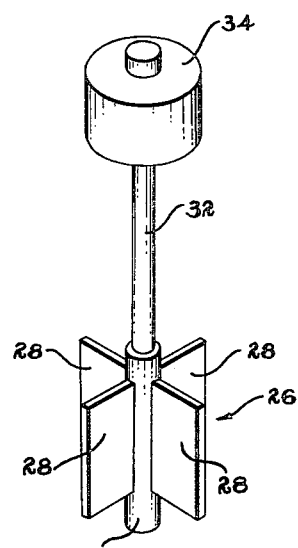
FIGURE 2 is a view in perspective of one mirror modulator which may be employed in the first, third and fifth embodiments of this invention.

Referring now to FIGURE 2, there is shown a mirror modulator 26 which includes four mirror members 28, each having reflecting surfaces on opposite sides thereof. The axis 30 of the modulator 26 is connected through suitable drive shaft 32 to a drive motor 34. The drive motor rotates the mirror about the axis of shaft 30. The advantages of this type modulator will be more clearly understood from an analysis of the graphical plot of FIGURE 3.

Figure 3:
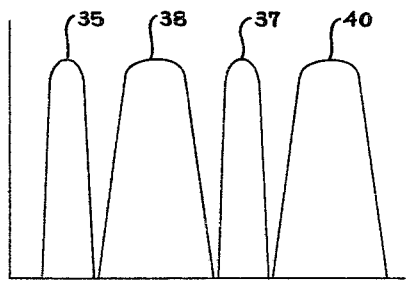
FIGURE 3 is a graphical representation of the wave form of the rays reflected from the rotating reflector of FIGURE 2.

Referring now to FIGURE 3, there is depicted a graphical representation of the wave form of the energy reflected from the rotating mirror modulator 26. If the axis of the transceiver 10 of FIGURE 1 is directed toward the modulator 26 along a line perpendicular to the axis of shaft 30 and the motor 34 is actuated, the reflected energy will correspond to the wave form shown in FIGURE 3. The individual mirror surfaces 28 will cause a sharp spike of energy such as spike 35 and 37 to be reflected toward the transceiver. However, when two mirror surfaces 28 are rotating through a position of approximately 45 degrees with respect to the axis of the transceiver 10, a high energy level pulse, such as 38 and 40, will be reflected toward the transceiver. If only a flat oscillating mirror surface were employed, the reflected energy would correspond to the spike 35 and 37 and there would be no high energy level reflections such as pulses 38 and 40. The advantage derived from these high energy level pulses are as follows. The system sensitivity is greatly increased while the possibility of false actuation of the detector by random signals is decreased. It is understood, of course, that a detector circuit (not shown) is connected to detector element 21. The circuit is insensitive to low energy level pulses such as 35 and 37 but sensitive to high energy level pulses such as pulses 38 and 40. The circuit will deliver an indication in response to a decrease in energy level of these signals.

In accordance with the third illustrative embodiment of this invention, a plurality of transceivers 10 are positioned in a single plane about the periphery of the area to be monitored and the modulator 26 is located in this same plane centrally of the area to be monitored. The axis of each transceiver 10 is directed toward the mirrors 28. When the motor 34 is actuated, the mirror modulator 26 reflects a modulated beam to each of the transceivers 10 in response to infra-red rays received from the several emitting elements 16. This is the preferred embodiment of the invention. This embodiment is preferred because of its simplicity. The transceiver represents the simplest combination of elements and the single modulator acts as the modulator for each of the transceivers.

Referring now to FIGURE 4, there is shown in block and pictorial form a complete area monitoring system in accordance with the illustrative embodiment of this invention previously referred to as the second embodiment of this invention. A source of infra-red rays 42 is enclosed by a modulator 44 which may, advantageously, be cylindrical in form and have a plurality of apertures spaced about its periphery. The modulator may be rotated by any convenient means, such as a motor, not shown. Rotation of the modulator periodically interrupts the infra-red rays transmitted in any given direction. A first reflector 46 is positioned at a distance from a source 42 slightly greater than the focal length of the reflector 46. Advantageously, reflector 46 may be a parabolic surface. With such an arrangement, the infra-red rays reaching the reflector 46 from the source 42 will be reflected in the general direction of the focal point of the reflector and this beam will be slightly converging. A second reflector 48 is positioned in front of reflector 46 and, advantageously, comprises a pair of reflector surfaces 49 and 50 positioned at right angles with respect to each other. This angle is bisected by the focal cord of reflector 46. The rays incident on surface 49 are reflected to surface 50 and, in turn, reflected toward the source. Similarly, the rays incident on surface 50 are reflected to surface 49 and returned as a converging beam toward source 42. With such an arrangement, the converging beam is reflected toward the source of infra-red rays and this beam converges toward the axis of reflector 46. A lens 52 is positioned axially of the parabolic reflector 46 to converge the beam still further and direct the beam onto infra-red detector 54.

Advantageously, this infra-red detector and those mentioned elsewhere in the specification may be of any convenient type known in the art and contains a sample of the gas to be detected. This detector may be of the narrow band type disclosed in application Serial No. 711,421, filed January 27, 1958, in the names of Herbert Laudon and William S. Tuerck, Jr. This detector includes an enclosure and a detector element sealed in the enclosure and surrounded by the particular gas or mixture of gases to be detected. The modulated radiation passes through a window in the enclosure and is absorbed by the detector gas thereby resulting in pressure variations. These pressure pulsations are translated into electrical signals by a detector element which is a pressure transducer. The pressure transducer or detector element is connected by its support wires to a polarizing preamplifier circuit.

Infra-red detector 54 is connected to a detector signal amplifier 56 which may be any convenient form of alternating-current amplifier well known in the art. The output of detector signal amplifier 56 is fed to a phase sensitive rectifier 58. The output of phase sensitive rectifier 58 is fed to indicator 60 and/or an alarm device 62.

A second infra-red detector 64 is positioned between the infra-red source 42 and the first infra-red detector 54 and serves the dual function of acting as a detector for synchronizing signals for the detection system and as a partial screen to prevent the direct transmission of infra-red rays from the source 42 to the first detector 54. The second or synchronizing detector is connected to a synchronizing signal amplifier 66. The output signal from synchronizing signal amplifier 66 is also fed to the phase sensitive rectifier 58. The signals delivered from the synchronizing signal amplifier 56 in response to the pulses of infra-red rays received by the second detector 64 will cause synhronizing signals to be periodically delivered to the phase sensitive rectifier 58.

Advantageously, these synchronizing signals increase the sensitivity of the rectifier 58 such that the system is more sensitive during the periods when the synchronizing signals are applied than when no synchronizing signals are applied. Shock and vibration effects are eliminated due to the action of the synchronous rectifier system. Response time approaches the source modulation period which may be $\frac{1}{60}$ second. Periods as small as $\frac{1}{1000}$ second may be used without serious loss of sensitivity. Such an arrangement prevents false operation by spurious signals and greatly improves the sensitivity of the area monitor and, therefore, provides a reliable alarm system.

Figure 5:
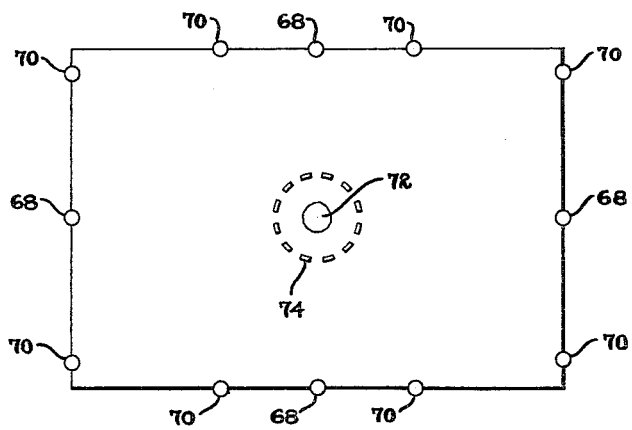
FIGURE 5 is a view in plan of a pictorial representation of the fourth illustrative embodiment of this invention.

Referring now to FIGURE 5, there is depicted a plan view of the fourth illustrative embodiment of this invention. In this embodiment, a plurality of transmitters 68 are positioned radially about the area to be monitored and located in a common plane and a plurality of receivers 70 are positioned in this same plane intermediate certain of the transmitters 68. A polygonal mirror 72 is positioned in the same plane as the transmitters and receivers centrally of the area to be monitored. This polygonal mirror is rotatably driven by means of a motor such as motor 34, shown in FIGURE 2. A slotted shield member 74 encircles the pilygonal mirror 72 and has its slots positioned in the path between respective transmitters and receivers and the mirror 72. Advantageously, a single transmitter 70 radiates wave energy toward the mirror 72 and mirror 72 reflects these infra-red rays toward receivers 70 on either side of the transmitter. Such an arrangement offers certain advantages over the other embodiments of this invention. For example, the number of transmitters required for a given area is reduced.

Referring now to FIGURE 6, there is depicted a monitor unit in accordance with another illustrative embodiment of this invention. The infra-red transmitter and receiver units are mounted on a bar 75, which bar may have an angle at a point between the transmitter and the receiver. The upper and lower portions 76 and 77, respectively, of the bar 75 may define an angle slightly less than 180°, such that the transmitter and receiver positioned on the upper and lower ends of the bar 75 will each be directed toward a common point. The transmitter and receiver units 78 and 80, respectively, are secured to the bar so that any rotation of the bar will rotate both of the units.

Transmitter 78 comprises a hollow cup-shaped body 81 open at its forward end and closed at its rearward end by circular base 83. Base 83 has two spaced apart rings 85 and 87 depending therefrom, which rings encircle the bar 75. A point 89 depends from ring 87 and engages bar 75 while a screw 91 extends through ring 85 and engages bar 75 for manual positioning and locking the transmitter in position. A point 88 depends from the base 83 and engages a groove 76 in the bar 75 to secure the transmitter 78 with respect to the bar 75. A parabolic reflector 90 is mounted within the base of cup-shaped body 78. An infrared emitter 93 is positioned at the focal point of reflector 90 by means of suspension wires 95, and is energized through these suspension wires by a convenient electrical source, not shown. A window 97 is mounted in the open end of cup-shaped body 81 to seal the inner compartment of the cup-shaped member. Receiver 80 is similar in construction to the transmitter 78 with the exception that an infra-red detector 98 is supported within the cup-shaped member in place of the emitter 93. The support wires 99 are connected in the detector circuit, not shown.

The gas detector system depicted in FIGURE 6 operates in the following manner. Infra-red radiation from emitter 93 is directed onto a modulator 26, as shown in FIGURE 2. Receiver 80 is positioned with respect to transmitter 78 such that the reflected rays will be directed to the gas infra-red sensitive detector element 98.

The indicator circuitry, not shown, may be of any convenient type known in the art which is connected to receiver 80 and will deliver a signal indicative of a decrease in the reflected modulated rays. This decrease will be in response to the presence of the gas between transmitter 78, the modulator 26 and the receiver 80.

Although flat oscillating type reflectors have been used in the past, such a reflector would result in separate sharp spikes or pulses, such as pulses 35 and 37 in FIGURE 3, of low energy content being reflected toward receiver 80. Advantageously, the crossed reflectors 28 produce a greatly increased energy reflection as compared to the flat oscillating type reflectors. In addition to producing sharp spikes or short pulses of low reflected energy, the perpendicular surfaces 28 cause relatively large semi-sinusoidal pulses of high energy content to be reflected toward the receiver 80. These semi-sinusoidal pulses occur between the sharp spikes and thus the crossed reflectors provide a relatively large amount of energy to the receiver. Accordingly, this system is much more sensitive to changes in the infra-red rays and hence the presence of the gas to be detected than known types of systems.

Referring now to FIGURE 7, there is depicted a perspective representation of an enclosure 100 to be monitored by the fifth illustrative embodiment of this invention. As therein depicted, an enclosure 100 has a number of transmitter-receiver units of the type shown in FIGURE 6 mounted around the walls thereof adjacent the ceiling. The modulator-reflector 102 is mounted centrally of the ceiling and acts as the modulator-reflector for all the transmitter-receiver combinations. Advantageously, the modulator 102 is provided with a stationary shielding member 104 having spaced apertures 106 therein. The shield 104 thus prevents the rays from one transmitter 78 from being reflected to one of the other receivers 80. Although a few pairs of transmitters and receivers are shown, it is understood that they may be spaced about the periphery of the enclosure 100.

It is, of course, understood that gas of the type for which the detecting elements, such as elements 21 and 98, are sensitized when introduced into the optical path will absorb radiation of a characteristic wave length in accordance with the amount of gas present. The presence of such gas will cause the intensity of the radiation reaching the detector to be decreased. This decrease in the infra-red rays received by the detector causes a signal to be developed by the electronic circuit, not shown, connected to the detector, thereby actuating an appropriate indicator or alarm system, also not shown.

While the salient features of the present invention have been described in detail with respect to certain embodiments, it will of course be apparent that numerous modifications may be made within the spirit and scope of the invention and it is, therefore, not desired to limit the invention to the exact details shown except insofar as they may be described in the following claims.

What is claimed is:

1. An area monitoring gas detection system comprising a plurality of transceivers each having a source of infra-red rays and a detector of infra-red rays isolated from said source, each of said transceivers being directed toward the mid-point of the area to be monitored, a rotatably mounted mirror modulator positioned at the inner section of the axis of said transceivers and means for rotating said mirror modulator, said mirror modulator comprising a plurality of perpendicularly positioned mirrors, whereby infra-red signals of high-energy level are reflected to each of said transceivers.

2. An area monitoring system according to claim 1 wherein each of said transceivers includes a reflector aligned between said transmitter and said detector.

3. A system according to claim 2 wherein each of said transceivers includes a curved mirror mounted in the rear end thereof, said detector being mounted axially of said mirror.

4. An area monitoring gas detection system including a plurality of separate transmitters and receivers each spaced about the periphery of the area to be monitored and each having their axis directed toward the center of said area, a polygonal reflector rotatably mounted at the intersection of said axes and means for rotating said reflector.

5. An area monitoring gas detection system comprising a plurality of pairs of separate transmitters and receivers, each pair being vertically aligned and having its axis directed toward the center of the area to be monitored, a mirror modulator rotatably mounted at the intersection of said axis and means for rotating said mirror modulator, said mirror modulator including a plurality of mirror surfaces positioned perpendicular with respect to each other.

6. A folded optical gas detection system comprising a source of infra-red rays, a first reflector positioned with respect to said source such that the source is at the focal point of said reflector, a second reflector positioned remote from said first reflector and directed toward said first reflector to reflect all rays received from said first reflector in a direction generally parallel to the axis of said first reflector, an infra-red detector mounted on the axis of said first reflector, a second detector positioned between said source and said first-mentioned detector wherein said second detector acts as a screen to prevent the direct infra-red rays from said source from reaching said first-mentioned detector and circuit means connected to said detectors, the signals from said second detector acting as synchronizing signals to periodically increase the sensitivity of said circuit means.

7. A gas detection system according to claim 6 wherein said first reflector is parabolic and has an aperture in the region of its axis and wherein said first detector is mounted on the axis of said first reflector.

8. A gas detection system according to claim 7 wherein said second reflector comprises a pair of angularly positioned mirrors.

References Cited in the file of this patent

UNITED STATES PATENTS

| | | |
|---|---|---|
| 1,746,525 | Darrah | Feb. 11, 1930 |
| 2,165,214 | Blau et al. | July 11, 1939 |
| 2,930,893 | Carpenter et al. | Mar. 29, 1960 |
| 2,974,230 | Harris | Mar. 7, 1961 |
| 2,985,783 | Garbuny et al. | May 23, 1961 |